(12) United States Patent
Vallius et al.

(10) Patent No.: US 9,791,703 B1
(45) Date of Patent: Oct. 17, 2017

(54) WAVEGUIDES WITH EXTENDED FIELD OF VIEW

(71) Applicant: MICROSOFT TECHNOLOGY LICENSING, LLC, Redmond, WA (US)

(72) Inventors: Tuomas Vallius, Espoo (FI); Jani Tervo, Espoo (FI)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/097,661

(22) Filed: Apr. 13, 2016

(51) Int. Cl.
*G02B 27/14* (2006.01)
*G02B 27/44* (2006.01)
(Continued)

(52) U.S. Cl.
CPC ....... *G02B 27/0172* (2013.01); *G02B 5/1814* (2013.01); *G02B 5/1819* (2013.01);
(Continued)

(58) Field of Classification Search
CPC ...... G02B 5/18; G02B 5/1828; G02B 6/0011; G02B 6/0033; G02B 27/0101;
(Continued)

(56) References Cited

U.S. PATENT DOCUMENTS 6,529,331 B2   3/2003   Massof et al.
6,563,648 B2   5/2003   Gleckman et al.
(Continued)

FOREIGN PATENT DOCUMENTS

CN   104035157 A   9/2014
CN   104280885 A   1/2015
(Continued)

OTHER PUBLICATIONS

Han, et al., "Portable Waveguide Display System with a Large Field of view by Integrating Freeform Elements and Volume Holograms", In Optics Express, vol. 23, Issue 3, Feb. 9, 2015, pp. 3534-3549.
(Continued)

*Primary Examiner* — Loha Ben
(74) *Attorney, Agent, or Firm* — Vierra Magen Marcus LLP

(57) ABSTRACT

An input-coupler of an optical waveguide couples light corresponding to the image and having a corresponding FOV into the optical waveguide, and the input-coupler splits the FOV of the image coupled into the optical waveguide into first and second portions by diffracting a portion of the light corresponding to the image in a first direction toward a first intermediate-component, and diffracting a portion of the light corresponding to the image in a second direction toward a second intermediate-component. An output-coupler of the waveguide combines the light corresponding to the first and second portions of the FOV, and couples the light corresponding to the combined first and second portions of the FOV out of the optical waveguide so that the light corresponding to the image and the combined first and second portions of the FOV is output from the optical waveguide. The intermediate-components and the output-coupler also provide for pupil expansion.

20 Claims, 5 Drawing Sheets

(51) Int. Cl.
| | |
|---|---|
| *G02B 5/18* | (2006.01) |
| *G02F 1/29* | (2006.01) |
| *H04N 13/04* | (2006.01) |
| *G02B 27/01* | (2006.01) |
| *F21V 8/00* | (2006.01) |
| *G02B 27/00* | (2006.01) |
| *G02B 27/22* | (2006.01) |
| *G02F 1/295* | (2006.01) |
| *G02B 27/42* | (2006.01) |

(52) U.S. Cl.
  CPC ............ *G02B 6/005* (2013.01); *G02B 6/0026* (2013.01); *G02B 27/0081* (2013.01); *G02B 27/2235* (2013.01); *G02B 27/44* (2013.01); *G02F 1/292* (2013.01); *G02F 1/295* (2013.01); *H04N 13/044* (2013.01); *H04N 13/0429* (2013.01); *G02B 5/18* (2013.01); *G02B 27/4205* (2013.01); *G02B 2005/1804* (2013.01); *G02B 2027/013* (2013.01); *G02B 2027/0125* (2013.01)

(58) Field of Classification Search
  CPC ............ G02B 27/0172; G02B 27/2235; G02B 27/4205; G02B 27/4272; G02B 27/44; G02B 2027/0123; G02B 2027/0125; G02B 2027/0145; G02B 5/1814; G02B 2005/1804; H04N 13/044; H04N 13/0429; G02F 1/292; G02F 1/295
  USPC .... 359/630, 632, 558, 566, 567; 385/10, 31, 385/37; 345/633
  See application file for complete search history.

(56) References Cited

U.S. PATENT DOCUMENTS

| | | | |
|---|---|---|---|
| 7,206,107 | B2 | 4/2007 | Levola |
| 7,483,604 | B2 | 1/2009 | Levola |
| 7,724,442 | B2 | 5/2010 | Amitai |
| 7,764,413 | B2 | 7/2010 | Levola |
| 7,876,489 | B2 | 1/2011 | Gandhi et al. |
| 8,160,411 | B2 | 4/2012 | Levola et al. |
| 8,169,704 | B2 | 5/2012 | Saito |
| 8,233,204 | B1 | 7/2012 | Robbins et al. |
| 8,314,993 | B2 | 11/2012 | Levola |
| 8,320,032 | B2 | 11/2012 | Levola |
| 8,411,365 | B2 | 4/2013 | Saito |
| 8,466,953 | B2 | 6/2013 | Levola |
| 8,508,848 | B2 | 8/2013 | Saarikko |
| 8,547,638 | B2 | 10/2013 | Levola |
| 8,593,734 | B2 | 11/2013 | Laakkonen |
| 8,654,420 | B2 | 2/2014 | Simmonds |
| 8,736,963 | B2 | 5/2014 | Robbins et al. |
| 8,749,890 | B1* | 6/2014 | Wood ................ G02B 27/0149 359/632 |
| 8,773,599 | B2 | 7/2014 | Saeedi et al. |
| 8,885,254 | B2 | 11/2014 | Saito et al. |
| 8,903,207 | B1* | 12/2014 | Brown ............... G02B 27/0103 359/1 |
| 8,913,324 | B2 | 12/2014 | Schrader |
| 8,934,171 | B2* | 1/2015 | Desserouer ........ G02B 27/0101 359/566 |
| 8,947,783 | B2 | 2/2015 | Gupta et al. |
| 8,989,535 | B2 | 3/2015 | Robbins |
| 9,097,890 | B2 | 8/2015 | Miller et al. |
| 9,124,066 | B2 | 9/2015 | Sridharan et al. |
| 9,164,290 | B2* | 10/2015 | Robbins ............. G02B 27/4205 |
| 9,274,338 | B2 | 3/2016 | Robbins et al. |
| 9,494,799 | B2* | 11/2016 | Robbins .................. G06F 3/013 |
| 2007/0188837 | A1 | 8/2007 | Shimizu et al. |
| 2009/0303599 | A1 | 12/2009 | Levola |
| 2010/0246003 | A1 | 9/2010 | Simmonds et al. |
| 2010/0296163 | A1 | 11/2010 | Saarikko |
| 2013/0250430 | A1 | 9/2013 | Robbins et al. |
| 2014/0104665 | A1 | 4/2014 | Popovich et al. |
| 2014/0140653 | A1 | 5/2014 | Brown et al. |
| 2014/0168260 | A1 | 6/2014 | O'Brien et al. |
| 2014/0300966 | A1 | 10/2014 | Travers et al. |
| 2015/0125109 | A1 | 5/2015 | Robbins et al. |
| 2015/0219842 | A1 | 8/2015 | Sqalli et al. |
| 2015/0260994 | A1 | 9/2015 | Akutsu et al. |
| 2015/0277116 | A1 | 10/2015 | Richards et al. |

FOREIGN PATENT DOCUMENTS

| | | |
|---|---|---|
| WO | 2006064334 A1 | 6/2006 |
| WO | WO2008/148927 A1 | 12/2008 |
| WO | 2014056631 A1 | 4/2014 |
| WO | 2014091204 A1 | 6/2014 |

OTHER PUBLICATIONS

"SBG Labs Delivers Transparent Display with Large Exit Pupil and Wide FOV for HMDS", Published on: Dec. 2012, Available at: http://www.digilens.com/sbg-labs-delivers-transparent-display-with-large-exit-pupil-and-wide-fov-for-hmds/.

Äyräs, et al., "Exit Pupil Expander with a Large Field of View Based on Diffractive Optics", In Journal of the Society for Information Display, vol. 17, Issue 8, Aug. 2009, 1 page.

Urey, Hakan, "Diffractive Exit-Pupil Expander for Display Applications", In Journal of Applied Optics, vol. 40, Issue 32, Nov. 10, 2001, pp. 5840-5851.

Kiyokawa, Kiyoshi, "A Wide Field-of-view Head Mounted Projective Display using Hyperbolic Half-silvered Mirrors", In Proceedings of the 6th IEEE and ACM International Symposium on Mixed and Augmented Reality, Nov. 13, 2007, 4 pages.

Rolland, et al., "Head-Mounted Display Systems", In Proceedings of Encyclopedia of optical engineering, Jan. 2005, pp. 1-14.

Kress, et al., "Diffractive and Holographic Optics as Optical Combiners in Head Mounted Displays", In Proceedings of the ACM conference on Pervasive and ubiquitous computing adjunct publication, Sep. 8, 2013, pp. 1479-1482.

Davidson, et al., "Diffractive Elements for Annular Laser Beam Transformation", In Journal of Applied Physics Letters, vol. 61, Issue 4, Jul. 27, 1992, pp. 381-383.

U.S. Appl. No. 15/097,929, filed Apr. 13, 2016 by Vallius et al.

International Search Report and the Written Opinion dated Jul. 6, 2017, in International Patent Application No. PCT/US2017/026253 filed Apr. 6, 2017.

* cited by examiner

WAVEGUIDES WITH EXTENDED FIELD OF VIEW

BACKGROUND

Various types of computing, entertainment, and/or mobile devices can be implemented with a transparent or semi-transparent display through which a user of a device can view the surrounding environment. Such devices, which can be referred to as see-through, mixed reality display device systems, or as augmented reality (AR) systems, enable a user to see through the transparent or semi-transparent display of a device to view the surrounding environment, and also see images of virtual objects (e.g., text, graphics, video, etc.) that are generated for display to appear as a part of, and/or overlaid upon, the surrounding environment. These devices, which can be implemented as head-mounted display (HMD) glasses or other wearable display devices, but are not limited thereto, often utilize optical waveguides to replicate an image, e.g., produced by a display engine, to a location where a user of a device can view the image as a virtual image in an augmented reality environment. As this is still an emerging technology, there are certain challenges associated with utilizing waveguides to display images of virtual objects to a user.

In HMDs and other types of imaging devices that utilize optical waveguides, such as heads up displays (HUDs), light propagates through the optical waveguide only over a limited range of internal angles. Light propagating parallel to the surface will, by definition, travel along the waveguide without bouncing. Light not propagating parallel to the surface will travel along the waveguide bouncing back and forth between the surfaces, so long as the angle of incidence with respect to the surface normal is greater than some critical angle associated with the material from which the optical waveguide is made. For example, for BK-7 glass, this critical angle is about 42 degrees. This critical can be lowered slightly by using a reflective coating, or by using a material having a higher index of refraction, which is typically more expensive. Regardless, the range of internal angles over which light will propagate through an optical waveguide does not vary very much, and for glass, the maximum range of internal angles is typically below 50 degrees. This typically results in a range of angles exiting the waveguide (i.e., angles in air) of less than 40 degrees, and typically even less when other design factors are taken into account. For example, in optical waveguides that include an intermediate-component used for pupil expansion, which is distinct from the input-coupler and output-coupler of the waveguide, the intermediate-component typically limits the diagonal field-of-view (FOV) that can be supported by an optical waveguide based display to no more than 35 degrees.

SUMMARY

Certain embodiments of the present technology relate to an apparatus for use in replicating an image associated with an input-pupil to an expanded output-pupil. In accordance with an embodiment, the apparatus comprises an optical waveguide including an input-coupler, first and second intermediate-components and an output-coupler. The input-coupler comprises a diffraction grating and is configured to couple light corresponding to the image associated with the input-pupil, and having a corresponding field of view (FOV), into the optical waveguide, diffract a portion of the light corresponding to the image in a first direction toward the first intermediate-component such that a first portion of the FOV travels through the optical waveguide from the input-coupler to the first intermediate-component, and diffract a portion of the light corresponding to the image in a second direction toward the second intermediate-component such that a second portion of the FOV travels through the optical waveguide from the input-coupler to the second intermediate-component, wherein the first and second directions differ from one another, and wherein the first and second portions of the FOV differ from one another. The first intermediate-component is configured to diffract light corresponding to the first portion of the FOV, which travels through the optical waveguide from the input-coupler to the first intermediate-component, toward the output coupler. The second intermediate-component is configured to diffract light corresponding to the second portion of the FOV, which travels through the optical waveguide from the input-coupler to the second intermediate-component, toward the output coupler. The output-coupler is configured to combine the light corresponding to the first and second portions of the FOV, which travel through the optical waveguide from the first and second intermediate-components to the output-coupler, and couple the light corresponding to the combined first and second portions of the FOV out of the optical waveguide so that the light corresponding to the image and the combined first and second portions of the FOV is output from the optical waveguide and viewable from the output-pupil. Additionally, each of the first and second intermediate-components is configured to perform one of horizontal or vertical pupil expansion, and the output-coupler is configured to perform the other one of horizontal or vertical pupil expansion. This way, the output-pupil (also known as an exit-pupil) is expanded, and thus larger, than the input-pupil (also known as an entrance-pupil). The input-coupler, by diffracting a portion of the light corresponding to the image in the first direction toward the first intermediate-component, and diffracting a portion of the light corresponding to the image in the second direction toward the second intermediate-component, splits the FOV into the first and second portions. The output-coupler, by combining the light corresponding to the first and second portions of the FOV, unifies the FOV that was split by the input-coupler. Beneficially, a unified FOV associated with the light coupled out of the optical waveguide, by the output-coupler, is greater than a maximum FOV that each of the first and second intermediate-components can support on their own. The unified FOV can also be referred to as a combined FOV.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
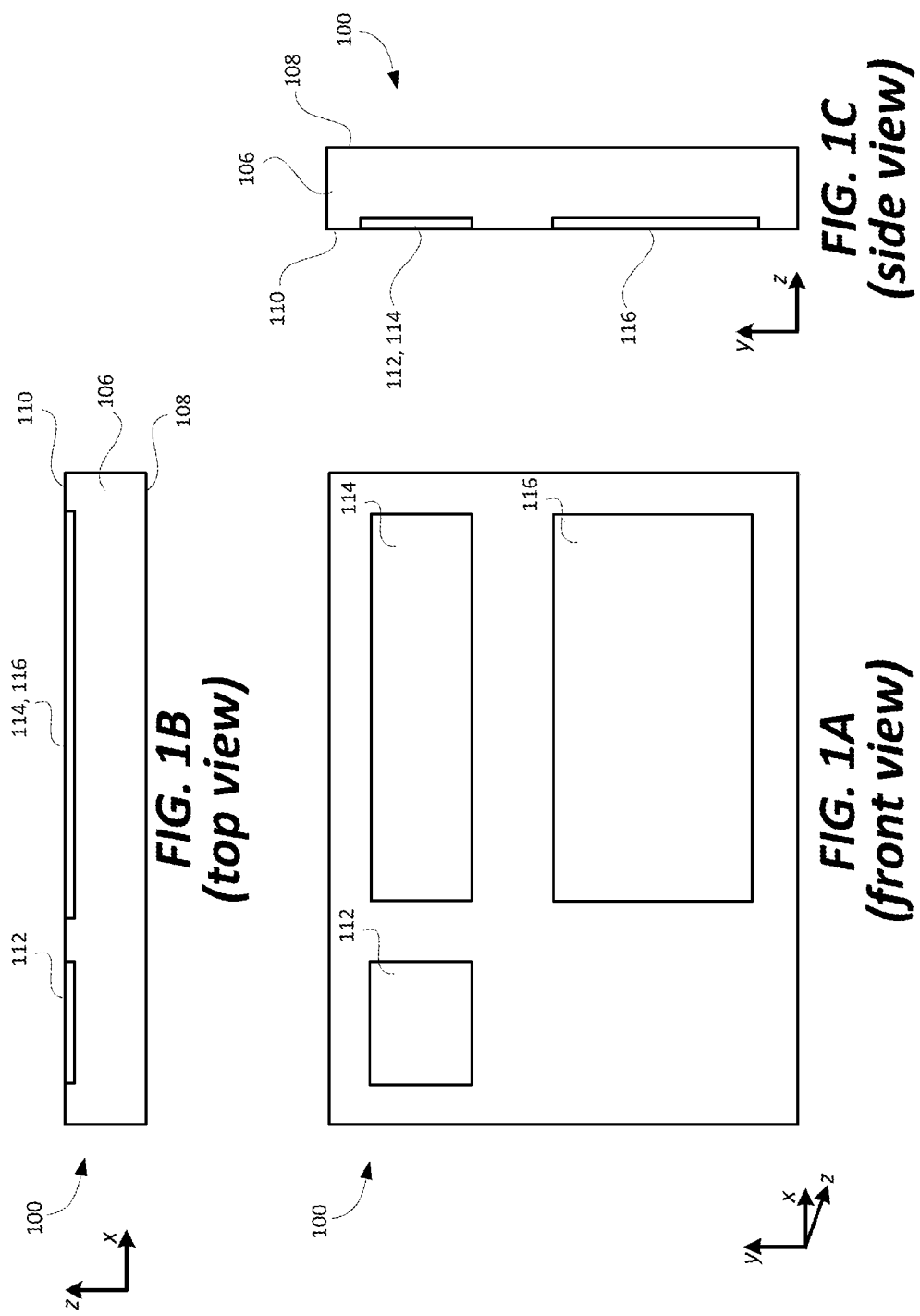
FIGS. 1A, 1B and 1C are front, top and side views, respectively, of an exemplary waveguide that can be used to replicate an image associated with an input-pupil to an expanded output-pupil.

Certain embodiments of the present technology can be used to increase (also referred to as expand) the field of view (FOV) that can be supported by an optical waveguide that includes one or more intermediate-components that are used to perform pupil expansion, wherein the intermediate component(s) is/are typically what limit how large of a FOV can be supported by such an optical waveguide. Before providing details of such embodiments, FIGS. 1A, 1B and 1C are first used to describe an exemplary optical waveguide and its components, as well as its limitations. In the description that follows, like numerals or reference designators will be used to refer to like parts or elements throughout. In addition, the first digit of each reference number identifies the drawing in which the reference number first appears.

FIGS. 1A, 1B and 1C are front, top and side views, respectively, of an exemplary optical waveguide 100 that can be used to replicate an image associated with an input-pupil to an expanded output-pupil. The term "input-pupil," as used herein, refers to an aperture through which light corresponding to an image is overlaid on an input-coupler of a waveguide. The term "output-pupil," as used herein, refers to an aperture through which light corresponding to an image exits an output-coupler of a waveguide. An input-pupil is sometimes also referred to as an entrance-pupil, and an output-pupil is sometimes also referred to as an exit-pupil. The optical waveguide 100 will often be referred to hereafter more succinctly simply as a waveguide 100. As will be discussed in further detail below with reference to FIG. 2, the image that the waveguide 100 is being used to replicate, and likely also expand, can be generated using a display engine.

Referring to FIGS. 1A, 1B and 1C, the optical waveguide 100 includes a bulk-substrate 106 having an input-coupler 112 and an output-coupler 116. The input-coupler 112 is configured to couple light corresponding to an image associated with an input-pupil into the bulk-substrate 106 of the waveguide. The output-coupler 116 is configured to couple the light corresponding to the image associated with the input-pupil, which travels in the optical waveguide 100 from the input-coupler 112 to the output-coupler 116, out of the waveguide 100 so that the light is output and viewable from the output-pupil.

The bulk-substrate 106, which can be made of glass or optical plastic, but is not limited thereto, includes a first major planar surface 108 and a second major planar surface 110 opposite and parallel to the first major planar surface 108. The first major planar surface 108 can alternatively be referred to as the front-side major surface 108 (or more simply the front-side surface 108), and the second major planar surface 110 can alternatively be referred to as the back-side major surface 110 (or more simply the back-side surface 110). As the term "bulk" is used herein, a substrate is considered to be "bulk" substrate where the thickness of the substrate (between its major surfaces) is at least ten times (i.e., 10×) the wavelength of the light for which the substrate is being used as an optical transmission medium. For an example, where the light (for which the substrate is being used as an optical transmission medium) is red light having a wavelength of 620 nm, the substrate will be considered a bulk-substrate where the thickness of the substrate (between its major surfaces) is at least 6200 nm, i.e., at least 6.2 µm. In accordance with certain embodiments, the bulk-substrate 106 has a thickness of at least 25 µm between its major planar surfaces 108 and 110. In specific embodiments, the bulk-substrate 106 has a thickness (between its major surfaces) within a range of 100 µm to 1500 µm, with a likely thickness of about 1000 µm. The bulk-substrate 106, and more generally the waveguide 100, is transparent, meaning that it allows light to pass through it so that a user can see through the waveguide 100 and observe objects on an opposite side of the waveguide 100 than the user's eye(s).

The optical waveguide 100 in FIGS. 1A, 1B and 1C is also shown as including an intermediate-component 114, which can alternatively be referred to as an intermediate-zone 114. Where the waveguide 100 includes the intermediate-component 114, the input-coupler 112 is configured to couple light into the waveguide 100 (and more specifically, into the bulk-substrate 106 of the waveguide 100) and in a direction of the intermediate-component 114. The intermediate-component 114 is configured to redirect such light in a direction of the output-coupler 116. Further, the intermediate-component 114 is configured to perform one of horizontal or vertical pupil expansion, and the output-coupler 116 is configured to perform the other one of horizontal or vertical pupil expansion. For example, the intermediate-component 114 can be configured to perform horizontal pupil expansion, and the output-coupler 116 can be configured to vertical pupil expansion. Alternatively, if the intermediate-component 114 were repositioned, e.g., to be below the input-coupler 112 and to the left of the output-coupler 116 shown in FIG. 1A, then the intermediate-component 114 can be configured to perform vertical pupil expansion, and the output-coupler 116 can be configured to perform horizontal pupil expansion.

The input-coupler 112, the intermediate-component 114 and the output-coupler 116 can be referred to collectively herein as optical components 112, 114 and 116 of the waveguide, or more succinctly as components 112, 114 and 116.

It is possible that a waveguide includes an input-coupler and an output-coupler, without including an intermediate-components. In such embodiments, the input-coupler would be configured to couple light into the waveguide and in a direction toward the output-coupler. In such embodiments, the output-coupler can provide one of horizontal or vertical pupil expansion, depending upon implementation.

In FIG. 1A, the input-coupler 112, the intermediate-component 114 and the output-coupler 116 are shown as having rectangular outer peripheral shapes, but can have alternative outer peripheral shapes. For example, the input-coupler 112 can alternatively have a circular outer peripheral shape, but is not limited thereto. For another example, the intermediate-component can have a triangular or hexagonal outer peripheral shape, but is not limited thereto. Further, it is noted that the corners of each of the peripheral shapes, e.g., where generally rectangular or triangular, can be chamfered or rounded, but are not limited thereto. These are just a few exemplary outer peripheral shapes for the input-coupler 112, the intermediate-component 114 and the output-coupler 116, which are not intended to be all encompassing.

As can best be appreciated from FIGS. 1B and 1C, the input-coupler 112, the intermediate-component 114 and the output-coupler 116 are all shown as being provided in or on a same surface (i.e., the back-side surface 110) of the waveguide 100. In such a case, the input-coupler 112 can be transmissive (e.g., a transmission grating), the intermediate-component 114 can be reflective (e.g., a reflective grating), and the output-coupler 116 can also be reflective (e.g., a further reflective grating). The input-coupler 112, the intermediate-component 114 and the output-coupler 116 can alternatively all be provided in the front-side surface 108 of the waveguide 100. In such a case, the input-coupler 112 can be reflective (e.g., a reflective grating), the intermediate-component 114 can be reflective (e.g., a further reflective grating), and the output-coupler 116 can also be transmissive (e.g., a transmission grating).

Alternatively, the input-coupler 112, the intermediate-component 114 and the output-coupler 116 can all be embedded (also referred to as immersed) in the bulk-substrate 106. For example, the bulk-substrate 106 can be separated into two halves (that are parallel to the major surfaces 108 and 110), and the input-coupler 112, the intermediate-component 114 and the output-coupler 116 can be provided in (e.g., etched into) one of the inner surfaces of the two halves, and the inner surfaces of the two halves can be adhered to one another. Alternatively, the bulk-substrate 106 can be separated into two halves (that are parallel to the major surfaces 108 and 110), and the input-coupler 112, the intermediate-component 114 and the output-coupler 116 can be provided between the inner surfaces of the two halves. Other implementations for embedding the input-coupler 112, the intermediate-component 114 and the output-coupler 116 in the bulk-substrate 106 are also possible, and within the scope of the embodiments described herein. It is also possible that one of the input-coupler 112, the intermediate-component 114 and the output-coupler 116 is provided in or on the front-side surface 108 of the waveguide 100, another one of the components 112, 114 and 116 is provided in or on the back-side surface 110, and the last one of the components 112, 114 and 116 is embedded or immersed in the bulk-substrate 106. More generally, unless stated otherwise, any individual one of the input-coupler 112, the intermediate-component 114 and the output-coupler 116 can be provided in or on either one of the major planar surfaces 108 or 110 of the bulk-substrate 106, or embedded therebetween.

The input-coupler 112, the intermediate-component 114 and the output-coupler 116 can each be implemented as a diffraction grating, or more generally, as a diffractive optical element (DOE). A diffraction grating is an optical component that may contain a periodic structure that causes incident light to split and change direction due to an optical phenomenon known as diffraction. The splitting (known as optical orders) and angle change depend on the characteristics of the diffraction grating. When the periodic structure is on the surface of an optical component, it is referred to a surface grating. When the periodic structure is due to varying of the surface itself, it is referred to as a surface relief grating (SRG). For example, an SRG can include uniform straight grooves in a surface of an optical component that are separated by uniform straight groove spacing regions. Groove spacing regions can be referred to as "lines", "grating lines" or "filling regions". The nature of the diffraction by an SRG depends on the wavelength, polarization and angle of light incident on the SRG and various optical characteristics of the SRG, such as refractive index, line spacing, groove depth, groove profile, groove fill ratio and groove slant angle. An SRG can be fabricated by way of a suitable microfabrication process, which may involve etching of and/or deposition on a substrate to fabricate a desired periodic microstructure on the substrate to form an optical component, which may then be used as a production master such as a mold or mask for manufacturing further optical components. An SRG is an example of a Diffractive Optical Element (DOE). When a DOE is present on a surface (e.g. when the DOE is an SRG), the portion of that surface spanned by that DOE can be referred to as a DOE area. A diffraction grating, instead of being a surface grating, can alternatively be a volume grating, such as a Bragg diffraction grating. It is also possible that one or more of the couplers are manufactured as SRGs and then covered within another material, e.g., using an atomic layer deposition process or an aluminum deposition process, thereby essentially burying the SRGs such that the major planar waveguide surface(s) including the SRG(s) is/are substantially smooth. Such a coupler is one example of a hybrid of a surface and volume diffraction grating. Any one of the input-coupler 112, the intermediate-component 114 and the output-coupler 116 can be, e.g., a surface diffraction grating, or a volume diffraction grating, or a hybrid of a surface and volume diffraction grating. In accordance with embodiments described herein, each diffraction grating can have a preferential linear polarization orientation specified by a direction of the grating lines of the diffraction grating, wherein the coupling efficiency for light having the preferential linear polarization orientation will be higher than for light having a non-preferential linear polarization orientation.

Where the input-coupler 112, the intermediate-component 114 and/or the output-coupler 116 is an SRG, each such SRG can be etched into one of the major planar surfaces 108 or 110 of the bulk-substrate 106. In such embodiments, the SRG can be said to be formed "in" the bulk-substrate 106. Alternatively, each SRG can be physically formed in a coating that covers one of the major planar surfaces 108 or 110 of the bulk-substrate 106, in which case each such SRG can be said to be formed "on" the bulk-substrate 106. Either way, the components 112, 114 and 116 are considered parts of the waveguide 100.

Referring specifically to FIG. 1A, in an exemplary embodiment, the input-coupler 112 can have surface gratings that extend in a vertical (y) direction, the output-coupler 116 can have surface gratings that extend in a horizontal (x) direction, and the intermediate-component 114 can have surface gratings that extend diagonal (e.g., ~45 degrees) relative to the horizontal and vertical directions. This is just an example. Other variations are also possible.

More generally, the input-coupler 112, the intermediate-component 114 and the output-coupler 116 can have various different outer peripheral geometries, can be provided in or on either of the major planar surfaces of the bulk-substrate, or can be embedded in the bulk-substrate 106, and can be implemented using various different types of optical structures, as can be appreciated from the above discussion, and will further be appreciated from the discussion below.

In general, light corresponding to an image, which is coupled into the waveguide via the input-coupler 112, can travel through the waveguide from the input-coupler 112 to the output-coupler 114, by way of total internal refection (TIR). TIR is a phenomenon which occurs when a propagating light wave strikes a medium boundary (e.g., of the bulk-substrate 106) at an angle larger than the critical angle with respect to the normal to the surface. In other words, the critical angle ($\theta_c$) is the angle of incidence above which TIR occurs, which is given by Snell's Law, as is known in the art. More specifically, Snell's law specifies that the critical angle ($\theta_c$) is specified using the following equation:

$$\theta_c = \sin^{-1}(n2/n1)$$

where $\theta_c$ the critical angle for two optical mediums (e.g., the bulk-substrate 106, and air or some other medium that is adjacent to the bulk-substrate 106) that meet at a medium boundary, n1 is the index of refraction of the optical medium in which light is traveling towards the medium boundary (e.g., the bulk-substrate 106, once the light is couple therein), and n2 is the index of refraction of the optical medium beyond the medium boundary (e.g., air or some other medium adjacent to the bulk-substrate 106).

Figure 2:
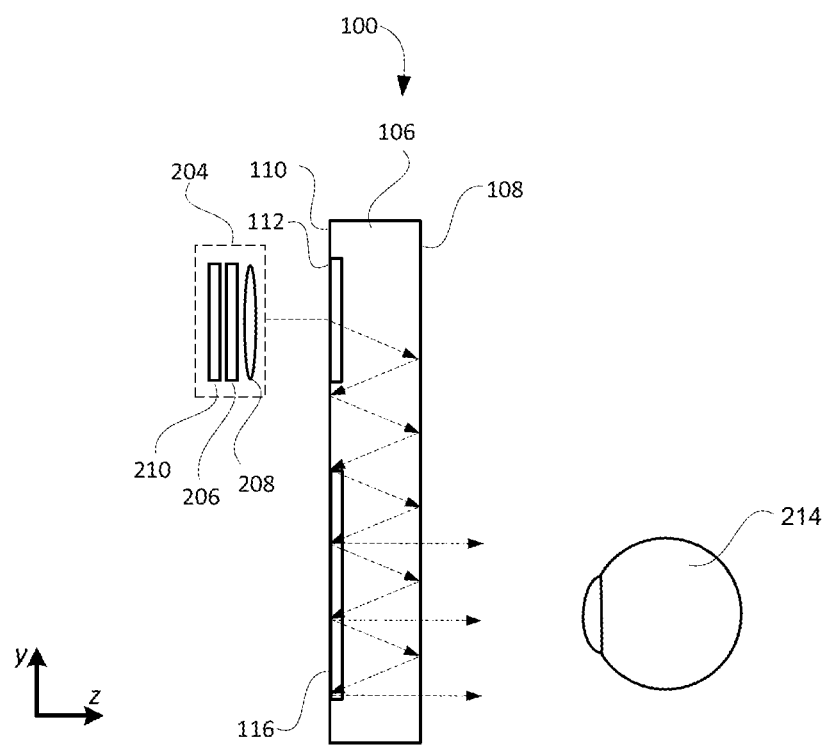
FIG. 2 is side view of the exemplary waveguide introduced with reference to FIGS. 1A, 1B and 1C, and also shows a display engine that generates an image including angular content that is coupled into the waveguide by an input-coupler, and also shows an eye that is viewing the image within an eye box that is proximate the output-coupler.

The concept of light traveling through the waveguide 100, from the input-coupler 112 to the output-coupler 114, by way of TIR, can be better appreciated from FIG. 2, which is discussed below. Referring now to FIG. 2, as in FIG. 10, FIG. 2 shows a side view of the waveguide 100, but also shows a display engine 204 that generates an image including angular content that is coupled into the waveguide by the input-coupler 112. Also shown in FIG. 2, is representation of a human eye 214 that is using the waveguide 100 to observe an image, produced using the display engine 204, as a virtual image.

The display engine 204 can include, e.g., an image former 206, a collimating lens 208 and an illuminator 210, but is not limited thereto. The image former 206 can be implemented using a transmissive projection technology where a light source is modulated by an optically active material, and backlit with white light. These technologies are usually implemented using liquid crystal display (LCD) type displays with powerful backlights and high optical energy densities. The illuminator 210 can provide the aforementioned backlighting. The image former 206 can also be implemented using a reflective technology for which external light is reflected and modulated by an optically active material. Digital light processing (DLP), liquid crystal on silicon (LCOS) and Mirasol® display technology from Qualcomm, Inc. are all examples of reflective technologies. Alternatively, the image former 206 can be implemented using an emissive technology where light is generated by a display, see for example, a PicoP™ display engine from Microvision, Inc. Another example of emissive display technology is a micro organic light emitting diode (OLED) display. Companies such as eMagin and Microoled provide examples of micro OLED displays. The image former 206, alone or in combination with the illuminator 210, can also be referred to as a micro display. The collimating lens 208 is arranged to receive a diverging display image from the image former 206, to collimate the display image, and to direct the collimated image toward the input-coupler 112 of the waveguide 100. In accordance with an embodiment, an entry pupil associated with the waveguide may be approximately the same size as an exit pupil associated with the image former 206, e.g., 5 mm or less in some embodiments, but is not limited thereto.

In FIG. 2, the display engine 204 is shown as facing the back-side surface 110 of the waveguide 100, and the eye 214 is shown as facing the front-side surface 108 opposite and parallel to the back-side surface 110. This provides for a periscope type of configuration in which light enters the waveguide on one side of the waveguide 100, and exits the waveguide at an opposite side of the waveguide 100. Alternatively, the input-coupler 112 and the output-coupler 116 can be implemented in a manner such that the display engine 204 and the eye 214 are proximate to and face a same major planar surface (108 or 110).

The waveguide 100 can be incorporated into a see-through mixed reality display device system, but is not limited to use therewith. A separate instance of the waveguide 100 and the display engine 204 can be provided for each of the left and right eyes of a user. In certain embodiments, such waveguide(s) 100 may be positioned next to or between see-through lenses, which may be standard lenses used in eye glasses and can be made to any prescription (including no prescription). Where a see-through mixed reality display device system is implemented as head-mounted display (HMD) glasses including a frame, the display engine 204 can be located to the side of the frame so that it sits near to a user's temple. Alternatively, the display engine 204 can be located in a central portion of the HMD glasses that rests above a nose bridge of a user. Other locations for the display engine 204 are also possible. In these instances, the user can also be referred to as a wearer. Where there is a separate waveguide for each of the left and right eyes of a user, there can be a separate display engine for each of the waveguides, and thus, for each of the left and right eyes of the user. One or more further adjacent waveguides can be used to perform eye tracking based on infrared light that is incident on and reflected from the user's eye(s) 214, as is known in the art.

The exemplary optical waveguide 100, described above with reference to FIGS. 1A, 1B, 10 and 2, can support a diagonal field-of-view (FOV) of only about 35 degrees, where the index of refraction of the bulk-substrate 106 is about 1.7 (i.e., n1~1.7). The optical component that limits the diagonal FOV to about 35 degrees is the intermediate-component 112, since the input-coupler 112 and the output-coupler 116 can each handle much larger diagonal FOVs than the intermediate-component 112. One way to attempt to increase (also referred to as extend) the diagonal FOV is to increase the index of refraction of the bulk-substrate 106 of the optical waveguide 100, which would enable the intermediate-component 112 to support a larger diagonal FOV. However, materials (e.g., glass) having such a high index of refraction are very expensive. Further, suitable materials for producing bulk-substrates having such a high index of refraction in large quantities are not readily available. Accordingly, literature about waveguide based displays that include intermediate-components, for use in pupil expansion, typically specify that the upper limit for the diagonal FOV is about 35 degrees.

In accordance with certain embodiments of the present technology, an optical waveguide includes at least two intermediate-components, each of which is used to support a different part of a FOV. More specifically, the input-coupler is designed to diffract light in at least two different (e.g., opposite) directions in order to guide light corresponding to an image to different intermediate-components. For example, by appropriately tuning the grating periods of the input-coupler, light corresponding to a left portion of a FOV is steered to a left intermediate-component, and light corresponding to a right portion of the FOV is steered to a right intermediate-component. Additionally, grating periods can be appropriately tuned so that part of the FOV (e.g., a central portion of the FOV) that is not to be steered to either of the left and right intermediate-components goes to an evanescent diffraction order that does not carry any power. More generally, through proper design and placement of an input-coupler and proper placement and design of two or more intermediate-components, different parts of a FOV can be guided in different directions. Such embodiments can provide two significant advantages. First, such embodiments can provide for a total diagonal FOV that is very large, even though each of the intermediate-components individually support a relatively smaller FOV (e.g., a diagonal FOV of no more than about 35 degrees). Additionally, since only a desired part of a FOV is guided in each of the different directions, there can be significant power savings (e.g., of up to 50%). Demonstrations of embodiments of the present technology have shown that such embodiments can be used to obtain a diagonal FOV of up to about 70 degrees, where the index of refraction of the bulk-substrate of the optical waveguide is about 1.7 (i.e., n1~1.7). Accordingly, it has been demonstrated that embodiments of the present technology can be used to double the diagonal FOV, compared to the FOV that could be achieved using the exemplary waveguide 100 described above with references to FIGS. 1A, 1B, 1C and 2. Through proper design, embodiments described herein can be used to provide even larger FOVs of up to about 90 degrees. It is noted that the term FOV, as used herein, refers to the diagonal FOV, unless stated otherwise.

Figure 3:
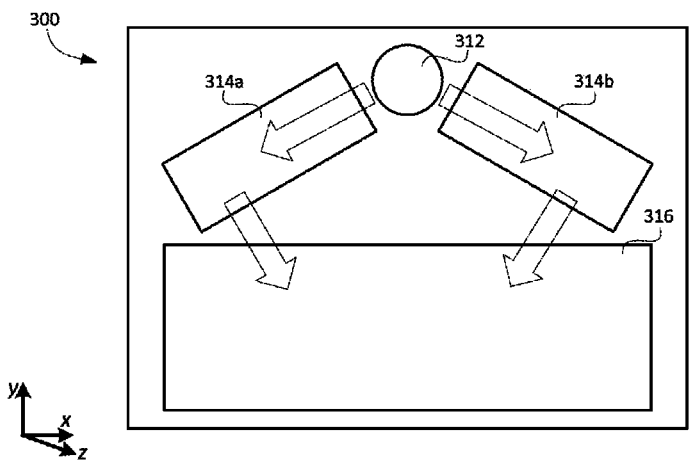
FIG. 3 is a front view of an optical waveguide, according to an embodiment of the present technology.

FIG. 3 is a front view of an optical waveguide 300, according to an embodiment of the present technology. Referring to FIG. 3, the optical waveguide 300 is shown as including an input-coupler 312, two intermediate-components 314a and 314b, and an output-coupler 316. The input-coupler 312 includes a diffraction grating and is configured to couple light corresponding to an image associated with an input-pupil, and having a corresponding FOV, into the optical waveguide 300 (and more specifically into the bulk-substrate of the optical waveguide). The input-coupler 312 is also configured to diffract a portion of the light corresponding to the image in a first direction toward the first intermediate-component 314a such that a first portion of the FOV travels through the optical waveguide 300 from the input-coupler 312 to the first intermediate-component 314a, and diffract a portion of the light corresponding to the image in a second direction toward the second intermediate-component 314b such that a second portion of the FOV travels through the optical waveguide 300 from the input-coupler 312 to the second intermediate-component 314b. The first and second portions of the FOV differ from one another, and depending upon implementation, may (or may not) partially overlap one another. The first and second directions, in which the input-coupler 212 diffracts light, also differ from one another. In the configuration shown, the first direction is a leftward direction, and the second direction is a rightward direction. More specifically, the first direction is both leftward and acutely angled downward, and the second direction is both rightward and acutely angled downward.

In the configuration shown, the intermediate-component 314a is configured to perform horizontal pupil expansion, and to diffract light corresponding to the first portion of the FOV, which travels through the optical waveguide from the input-coupler 312 to the first intermediate-component 314a, toward the output coupler 316. The intermediate-component 314b is configured to perform horizontal pupil expansion, and to diffract light corresponding to the second portion of the FOV, which travels through the optical waveguide from the input-coupler 312 to the second intermediate-component 314b, toward the output coupler 316. The intermediate-components 314a and 314b can individually be referred to as an intermediate-component 314, or collectively as intermediate-components 314. In alternative embodiments, the layout and optical components can be rearranged and reconfigured (e.g., by rotating the layout by 90 degrees) such that the intermediate-components 314 are configured to perform vertical pupil expansion, and the output-coupler 316 is configured to perform horizontal pupil expansion. More generally, the intermediate-components can be configured to perform one of horizontal or vertical pupil expansion, and the output-coupler can be configured to perform the other one of horizontal or vertical pupil expansion.

In the configuration shown, the output-coupler 316 is configured to combine the light corresponding to the first and second portions of the FOV, which travel through the optical waveguide from the first and second intermediate-components 314a and 314b to the output-coupler 316. The output-coupler 316 is also configured to couple the light corresponding to the combined first and second portions of the FOV out of the optical waveguide 300 so that the light corresponding to the image and the combined first and second portions of the FOV is output from the optical waveguide 300 and viewable from an output-pupil.

The input-coupler 312, the intermediate-component 314 and the output-coupler 316 can be referred to collectively herein as optical components 312, 314 and 316 of the waveguide, or more succinctly as components 312, 314 and 316.

In the FIGS. (e.g., FIGS. 1, 2 and 3), the waveguides (e.g., 100 and 300) were typically shown as including a pair of planar surfaces. In an alternative embodiment, surfaces of a waveguide (e.g., 100, 300, 400, 500 or 600) could be non-planar, i.e., curved. While gratings may be more easily manufacture on or in planar surfaces, with curved surface(s) it could be possible to reduce some of the aberrations in a system.

As noted above, in optical waveguide that include an intermediate-component used for pupil expansion, which is distinct from the input-coupler and output-coupler of the waveguide, the intermediate-component typically limits the diagonal FOV of waveguide based displays to no more than 35 degrees. In other words, intermediate-component(s) can typically only support a FOV up to about 35 degrees. By contrast, the input-coupler and the output-coupler of an optical waveguide are each able to support a much larger FOV than an individual intermediate-component. More specifically, the input-coupler and the output-coupler of an optical waveguide can each support a FOV that is at least twice as large as an intermediate component. Accordingly, the intermediate-component is typically the optical component of an optical waveguide that limits the total FOV that can be achieved using the optical waveguide.

In the embodiments of the present technology described herein, including the embodiment just described above with reference to FIG. 3, the input-coupler 312, by diffracting a portion of the light corresponding to the image in the first direction toward the first intermediate-component 314a, and diffracting a portion of the light corresponding to the image in the second direction toward the second intermediate-component 314b, splits the FOV into the first and second portions. The output-coupler 316, by combining the light corresponding to the first and second portions of the FOV, unifies the FOV that was split by the input-coupler 312. Beneficially, the FOV associated with the light coupled out of the optical waveguide 300, by the output-coupler 312, is greater than a maximum FOV that each of the first and second intermediate-components 314 can support on their own.

Assume that the FOV of the light coupled into the waveguide 300 by the input-coupler 312 is about 70 degrees, and that the each of the intermediate-component 314a and 314b can individually support a FOV of only about 35 degrees. In this example, the input-coupler 312 can split the 70 degree FOV into a first 35 degree FOV portion (which travel by way of TIR to the first intermediate-component 314a) and a second 35 degree FOV portion (which travel by way of TIR to the second intermediate-component 314b). For example, the first portion of the FOV can be from 0 to 35 degrees, and the second portion of the FOV can be from 35 to 70 degrees. The output-coupler 316 can then combine the light corresponding to the first 35 degree portion of the FOV (which travel through the optical waveguide by way of TIR from the first intermediate-component 314a to the output-coupler 316) and the light corresponding to the second 35 degree FOV (which travel through the optical waveguide by way of TIR from the second intermediate-components 314b to the output-coupler 316), to thereby unify the two 35 degree FOV portions into the original FOV of about 70 degrees. The output-coupler 316 couples the light corresponding to the combined first and second portions of the FOV, i.e., combined to have the FOV of about 70 degrees, out of the optical waveguide 300 so that the light corresponding to the image and the combined first and second portions of the FOV is output from the optical waveguide 300 and viewable from an output-pupil. Accordingly, the about 70 degree FOV associated with the light coupled out of the optical waveguide 300, by the output-coupler 312, is greater than the about 35 degree FOV that each of the first and second intermediate-components 314a and 314b can support on their own.

As noted above, the first and second portions of the FOV differ from one another, and depending upon implementation, may (or may not) partially overlap one another. Accordingly, where first and second portions of the FOV partially overlap one another, the first portion of the FOV may be, e.g., from 2 to 37 degrees, and the second portion of the FOV may be from 33 to 68 degrees. This is just one example, which is not intended to be limiting.

In accordance with certain embodiments, the input-coupler 312, the intermediate-components 314 and the output-coupler 316 can each be implemented as a DOE. In accordance with certain embodiments, the input-coupler 312, the intermediate-components 314 and the output-coupler 316 are implemented as SRG type DOEs that are in or on one (or both) of the major surfaces of the waveguide 300. In certain embodiments, each of the SRGs can include uniform straight grooves in or on only one of the major surfaces of the waveguide 300, which grooves are separated by uniform straight groove spacing regions. The nature of the diffraction by each SRG depends both on the wavelength of light incident on the grating and various optical characteristics of the SRG, such as line spacing, groove depth and groove slant angle. Each SRG can be fabricated by way of a suitable microfabrication process, which may involve etching of and/or deposition on a substrate to fabricate a desired periodic microstructure in or on the substrate to form an optical component, which may then be used as a production master such as a mold or mask for manufacturing further optical components.

In accordance with certain embodiments, the input-coupler 312 is implemented as an SRG in or one only one of the major surfaces of the waveguide 300, wherein the line spacing of the gratings of the input-coupler 312 is constant, but the slant angle of a first half the gratings is optimized to direct a portion of the light incident on the input-coupler 312 in the direction of the first intermediate-component 314a, and the slant angle of a second half the gratings is optimized to direct a portion of the light incident on the input-coupler 312 in the direction of the second intermediate-component 314b.

In accordance with other embodiments, the input-coupler 312 is implemented as an SRG in or one both of the major surfaces of the waveguide 300. In such an embodiment, a first SRG is located in or on one the major surfaces of the optical waveguide 300 and is configured to diffract the light corresponding to a first portion of the FOV in a first direction toward the first intermediate-component 314a, and a second SRG is located in or on the other one of the major surfaces of the optical waveguide 300 and is configured to diffract the light corresponding to a second portion of the FOV in a second direction toward the second intermediate-component 314b. In accordance with an embodiment, the grating period of the first SRG of the input-coupler 312 is the same as the grating period of the second SRG of the input-coupler 312, but the slant angles differ from one another. In accordance with another embodiment, the grating period of the first SRG of the input-coupler 312 differs from the grating period of the second SRG of the input-coupler 312.

Figure 4:
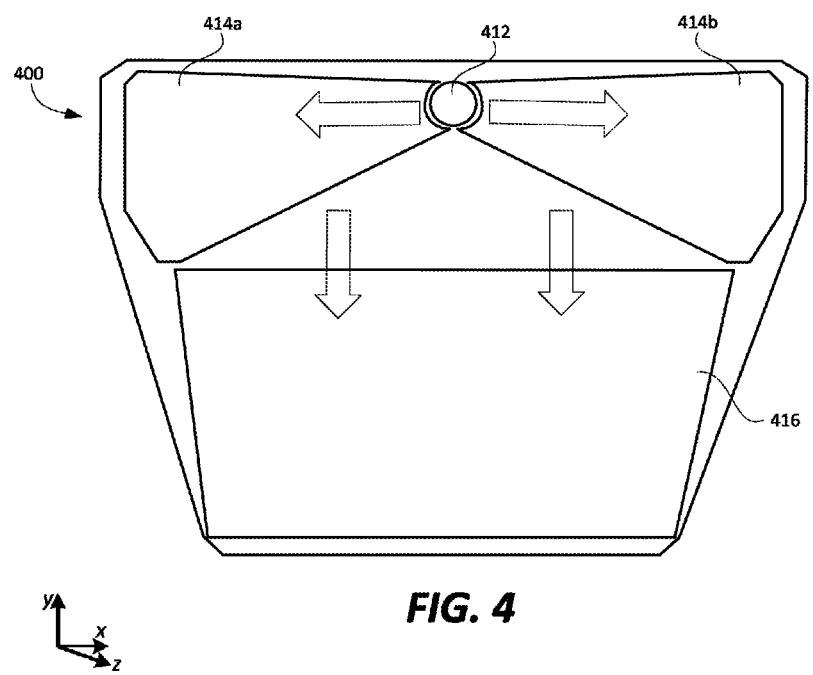
FIG. 4 is a front view of an optical waveguide, according to another embodiment of the present technology.

FIG. 3 illustrates just one exemplary layout for the input-coupler, intermediate-components and output-coupler. FIG. 4 illustrates an alternative layout for the input-coupler, intermediate-components and output-coupler. Referring to FIG. 4, an input-coupler 412 includes a diffraction grating and is configured to couple light corresponding to an image associated with an input-pupil, and having a corresponding FOV, into the optical waveguide 400, diffract a portion of the light corresponding to the image in a first direction toward a first intermediate-component 414a such that a first portion of the FOV travels through the optical waveguide 400 from the input-coupler 412 to the first intermediate-component 414a, and diffract a portion of the light corresponding to the image in a second direction toward a second intermediate-component 414b such that a second portion of the FOV travels through the optical waveguide 400 from the input-coupler 412 to the second intermediate-component 414b. In the configuration shown, the first direction is a leftward direction, and the second direction is a rightward direction. An output-coupler 416 is configured to combine the light corresponding to the first and second portions of the FOV, which travel through the optical waveguide from the first and second intermediate-components 414a and 414b to the output-coupler 416. The output-coupler 416 is also configured to couple the light corresponding to the combined first and second portions of the FOV out of the optical waveguide 400 so that the light corresponding to the image and the combined first and second portions of the FOV is output from the optical waveguide 400 and viewable from an output-pupil.

In certain embodiments, the optical waveguide includes one or more further intermediate-components, which is/are in addition to the first and second intermediate-components, and the input-coupler is also configured to diffract light corresponding to at least a portion of the FOV to each of the one or more further intermediate-components. In such embodiments, the one or more further intermediate-components is/are each configured to diffract light, corresponding to at least a portion of the FOV that is incident on the further intermediate-component, toward the output-coupler of the optical waveguide. Examples of such embodiments are shown in FIGS. 5 and 6.

Figure 5:
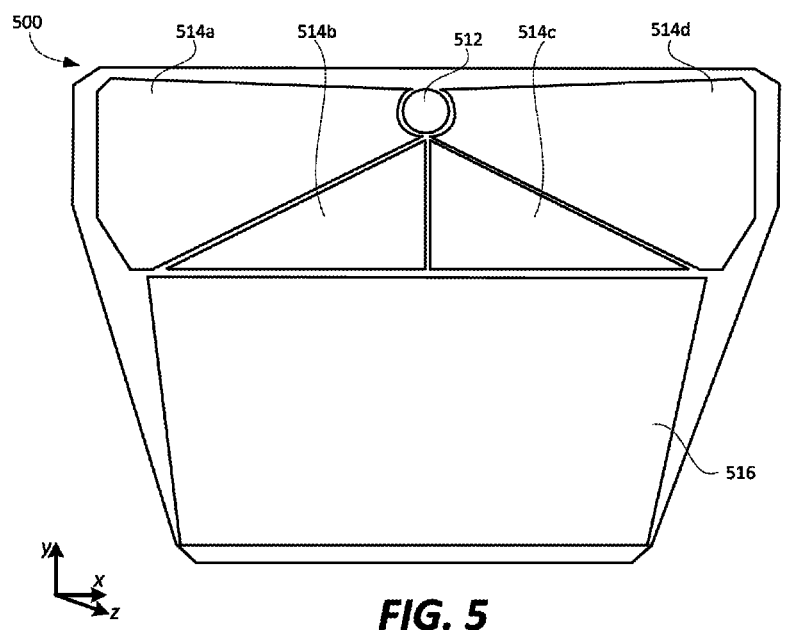
FIG. 5 is a front view of an optical waveguide, according to a further embodiment of the present technology.
Figure 6:
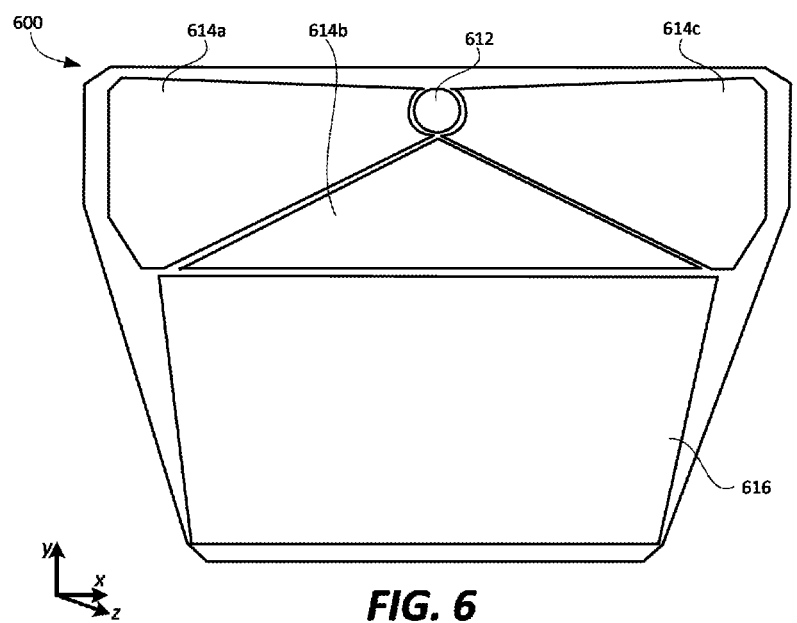
FIG. 6 is a front view of an optical waveguide, according to still another embodiment of the present technology.

Referring to FIG. 5, an optical waveguide 500 is shown as including an input-coupler 512, four intermediate-components 514a, 514b, 514c and 514d, and an output-coupler 516. The input-coupler 512 includes one or more diffraction gratings and is configured to couple light corresponding to an image associated with an input-pupil, and having a corresponding FOV, into the optical waveguide 500. The input-coupler 514a is also configured to diffract a portion of the light corresponding to the image in a first direction toward the intermediate-component 514a such that a first portion of the FOV travels through the optical waveguide 500 from the input-coupler 512 to the intermediate-component 514a, diffract a portion of the light corresponding to the image in a second direction toward the intermediate-component 414b such that a second portion of the FOV travels through the optical waveguide 500 from the input-coupler 512 to the intermediate-component 514b, diffract a portion of the light corresponding to the image in a third direction toward the intermediate-component 514c such that a third portion of the FOV travels through the optical waveguide 500 from the input-coupler 512 to the intermediate-component 514c, and diffract a portion of the light corresponding to the image in a fourth direction toward the fourth intermediate-component 514d such that a fourth portion of the FOV travels through the optical waveguide 500 from the input-coupler 512 to the intermediate-component 514d.

In the embodiment of FIG. 5, the portion of the FOV provided to the intermediate-component 514a differs from the portion of the FOV provided to the intermediate-component 514d, and the portion of the FOV provided to the intermediate-component 514b differs from the portion of the FOV provided to the intermediate-component 514c. Depending upon implementation, the portion of the FOV provided to the intermediate-component 514b may be the same or different that the portion of the FOV provided to the intermediate component 514a; and the portion of the FOV provided to the intermediate-component 514c may be the same or different that the portion of the FOV provided to the intermediate component 514d. In accordance with an embodiment, the grating period of the input-coupler 512 is tuned so that part of the FOV that is not to be steered to either of the intermediate-components 514a and 514d goes to an evanescent diffraction order that does not carry any power.

In the embodiment of FIG. 5, each of the intermediate components 514a and 514d is configured to perform horizontal pupil expansion, and diffract light having a respective portion of the original FOV toward the output-coupler 516. The intermediate components 514b and 514c can also be configured to perform horizontal pupil expansion, and diffract light having a respective portion of the original FOV toward the output-coupler 516. Alternatively, the intermediate components 514b and 514c can diffract light having a respective portion of the original FOV toward the output-coupler 516 without performing any pupil expansion, in which case the middle portion of the output-coupler 516 can output light corresponding to the image having a FOV coming straight from the input-coupler 512. The output-coupler 516 is also configured to combine the FOVs and couple the light corresponding to the combined FOVs out of the optical waveguide 500 so that the light corresponding to the image and the combined FOVs is output from the optical waveguide 500 and viewable from an output-pupil.

Referring to FIG. 6, an optical waveguide 600 is shown as including an input-coupler 612, three intermediate-components 614a, 614b and 614c, and an output-coupler 616. The input-coupler 612 includes one or more diffraction gratings and is configured to couple light corresponding to an image associated with an input-pupil, and having a corresponding FOV, into the optical waveguide 600. The input-coupler 614a is also configured to diffract a portion of the light corresponding to the image in a first direction toward the first intermediate-component 614a such that a first portion of the FOV travels through the optical waveguide 600 from the input-coupler 612 to the first intermediate-component 614a, diffract a portion of the light corresponding to the image in a second direction toward the second intermediate-component 614b such that a second portion of the FOV travels through the optical waveguide 600 from the input-coupler 612 to the second intermediate-component 614b, and diffract a portion of the light corresponding to the image in a third direction toward the third intermediate-component 614c such that a third portion of the FOV travels through the optical waveguide 600 from the input-coupler 612 to the third intermediate-component 614c.

In the embodiment of FIG. 6, the portion of the FOV provided to the intermediate-component 614a differs from the portion of the FOV provided to the intermediate-component 614c. The portion of the FOV provided to the intermediate-component 514b can include part of the FOV provided to the intermediate-component 614a and part of the FOV provided to the intermediate-component 614c. The portion of the FOV provided to the intermediate-component 514b can alternatively be distinct from the portion of the FOV provided to the intermediate-component 614a and portion of the FOV provided to the intermediate-component 614c. In accordance with an embodiment, the grating period of the input-coupler 612 is tuned so that part of the FOV that is not to be steered to either of the intermediate-components 614a and 614c goes to an evanescent diffraction order that does not carry any power.

In the embodiment of FIG. 6, each of the intermediate components 614a and 614c is configured to perform horizontal pupil expansion, and diffract light having a respective portion of the original FOV toward the output-coupler 616. The intermediate component 614b can also be configured to perform horizontal pupil expansion, and diffract light having a respective portion of the original FOV toward the output-coupler 616. Alternatively, the intermediate components 614b can diffract light having a respective portion of the original FOV toward the output-coupler 616 without performing any pupil expansion, in which case the middle portion of the output-coupler 616 can output light corresponding to the image having a FOV coming straight from the input-coupler 612. The output-coupler 616 is also configured to combine the FOVs and couple the light corresponding to the combined FOVs out of the optical waveguide 600 so that the light corresponding to the image and the combined FOVs is output from the optical waveguide 600 and viewable from an output-pupil.

While not specifically shown in FIGS. 3-6, each of the optical waveguides (300, 400, 500 and 600) is for use with a display engine, which can be the same as or similar to the display engine 204 described above with reference to FIG. 2, but is not limited thereto. For example, the display engine (e.g., 204) can face a back-side surface of one of the optical waveguides (300, 400, 500 or 600), and a user's eye (e.g., the eye of a person wearing HMD glasses) can facing a front-side surface opposite and parallel to the back-side surface, to provide for a periscope type of configuration in which light enters the waveguide on one side of the waveguide, and exits the waveguide at an opposite side of the waveguide. Alternatively, the input-coupler and the output-coupler can be implemented in a manner such that the display engine and a user's eye are proximate to and face a same major surface of the optical waveguide.

Where optical waveguides are used to perform pupil replication (also referred to as image replication), nonuniformities in local and global intensities may occur, which may result in dark and light fringes and dark blotches when the replicated image is viewed, which is undesirable. The embodiments shown in and described with reference to FIGS. 5 and 6 may provide for improved intensity distributions, and thereby, can be used to improve the replicated image when viewed, compared to the embodiments shown in and described with reference to FIGS. 3 and 4.

In the embodiments described herein, each of the diffraction gratings, instead of being a surface grating, can alternatively be a volume grating, such as a Bragg diffraction grating. It is also possible that one or more of the couplers are manufactured as SRGs and then covered within another material, e.g., using an aluminium deposition process, thereby essentially burying the SRGs such that the major planar waveguide surface(s) including the SRG(s) is/are substantially smooth. Such a coupler is one example of a hybrid of a surface and volume diffraction grating. Any one of the input-coupler (e.g., 312, 412, 512, 612), the intermediate-components (e.g., 314, 414, 514, 614) and the output-coupler (e.g., 316, 416, 516, 616) can be, e.g., a surface diffraction grating, or a volume diffraction grating, or a hybrid of a surface and volume diffraction grating. In accordance with embodiments described herein, each diffraction grating can have a preferential linear polarization orientation specified by a direction of the grating lines of the diffraction grating, wherein the coupling efficiency for light having the preferential linear polarization orientation will be higher than for light having a non-preferential linear polarization orientation.

Using embodiments described herein, a large FOV of at least 70 degrees, and potentially up to 90 degrees or even larger can be achieved by an optical waveguide that utilizes intermediate-components to provide pupil expansion, even where the intermediate-components individually can only support of FOV of about 35 degrees. Additionally, where only a portion of the total FOV is guided to disparate intermediate-components, a power savings of up to 50% can be achieved when compared to a situation where the FOV is not split by the input-coupler.

In many designs of HMDs, the input-coupler of an optical waveguide is located near the temple or nose bridge region of a wearer, when the HMD is being worn. This may be the case with the embodiments described above with reference to FIGS. 1 and 2. In the embodiments shown in FIGS. 3-6, by contrast, the input-coupler may be directly above the eye of the wearer of an HMD, resulting in a shorter the propagation distance that light corresponding to the image travels between the input-coupler and the output-coupler, before the light is output and viewed by the eye of the wearer. This shorter distance results in a lower cumulative error. Furthermore, if light corresponding to a portion (e.g., a middle portion) of the FOV is steered directly from the input-coupler to the output-coupler, so that light does not interact significantly with an intermediate-component, then a combination of two-dimensional and one-dimensional pupil expansion can be supported by a single optical waveguide.

The optical waveguides (e.g., 300, 400, 500, 600) described herein can be incorporated into a see-through mixed reality display device system. The same waveguide can be used to steer light of multiple different colors (e.g., red, green and blue) associated with an image from the input-coupler to the output-coupler. Alternatively, three waveguides can be stacked adjacent to each other, with each of the waveguides being used to steer light of a different color (e.g., red, green or blue) associated with an image from its respective input-coupler to its output-coupler. It would also be possible that one waveguide handle light of two colors (e.g., green and blue) and another waveguide handles light of a third color (e.g., red). Other variations are also possible.

The optical waveguides (e.g., 300, 400, 500 or 600) described herein are for use in steering light from an input-coupler to an output-coupler, where the light is out-coupled for viewing or imaging by one of a person's two eyes (i.e., either their left or right eye). One or more further instances of the waveguide (e.g., 300, 400, 500 or 600) can be provided for the other eye. In other words, a separate instance of the waveguide (e.g., 300, 400, 500 or 600) and the display engine 204 can be provided for each of the left and right eyes of a user. In certain embodiments, such waveguide(s) may be positioned next to or between see-through lenses, which may be standard lenses used in eye glasses and can be made to any prescription (including no prescription). Where there is a separate waveguide for each of the left and right eyes of a user, there can be a separate display engine for each of the waveguides, and thus, for each of the left and right eyes of the user. One or more further adjacent waveguides can be used to perform eye tracking based on infrared light that is incident on and reflected from the user's eye(s) 214, as is known in the art.

In FIGS. 3, 4, 5 and 6, the input-couplers, the intermediate-components and the output-couplers are shown as having specific outer peripheral shapes, but can have alternative outer peripheral shapes. Similarly, the peripheral shape of the optical waveguides can also be changed, while still being within the scope of embodiments described herein.

In certain embodiments, the input-coupler (e.g., 312, 412, 512, 612) can have surface gratings that extend in a vertical (y) direction, the output-coupler (e.g., 316, 416, 516, 616) can have surface gratings that extend in a horizontal (x) direction, and certain intermediate-components (e.g., 314a, 414a, 514a, 614a) can have surface gratings that extend diagonal (e.g., ~45 degrees) relative to the horizontal and vertical directions, and other intermediate-components (e.g., 314b, 414b, 514d, 614c) can have surface gratings that extend diagonal (e.g., ~45 degrees) in the other direction. These are just a few examples. Other variations are also possible and within the scope of embodiments of the present technology. Depending upon implementation, the grating periods of the intermediate-components of an optical waveguide can all be the same, or can all be different. Regardless, two or more of the intermediate-components of an optical waveguide should perform pupil expansion and steer light toward the output-coupler of the optical waveguide.

Figure 7:
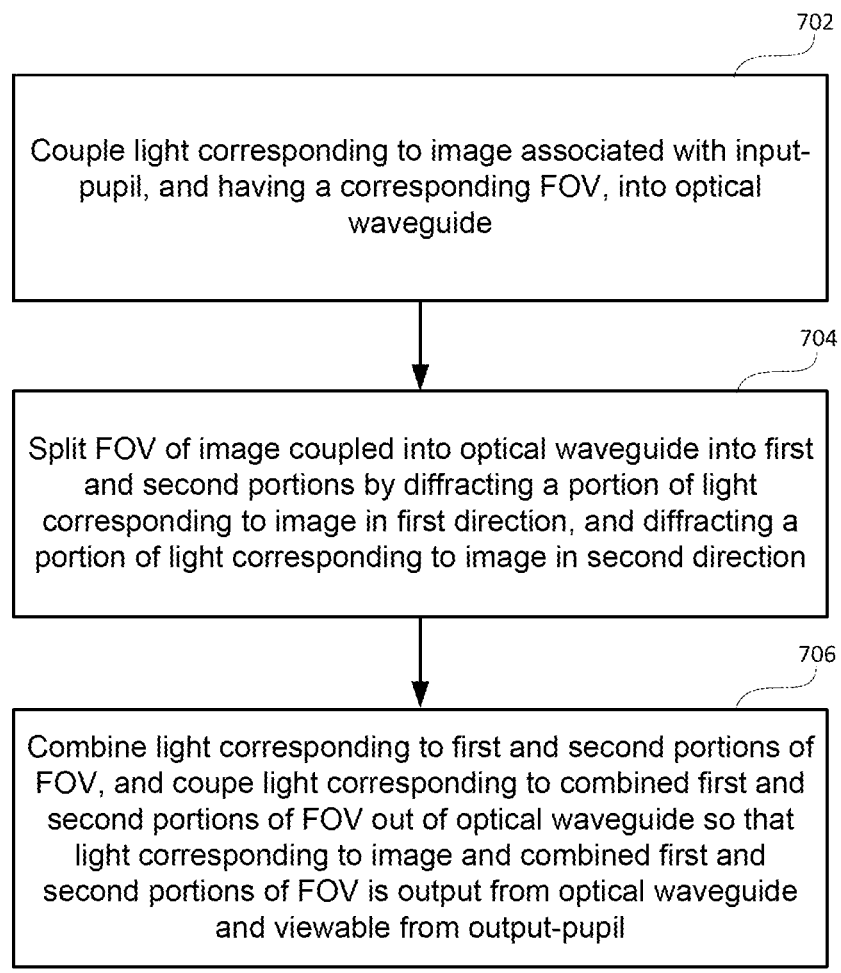
FIG. 7 is a high level flow diagram that is used to summarize methods according to embodiments of the present technology.

The high level flow diagram of FIG. 7 will now be used to summarize methods according to certain embodiments of the present technology. The methods described with reference to FIG. 7 utilize an optical waveguide to replicate an image associated with an input-pupil to an output-pupil. Referring to FIG. 7, step 702 involves coupling light corresponding to the image associated with the input-pupil, and having a corresponding FOV, into the optical waveguide. Step 704 involves splitting the FOV of the image coupled into the optical waveguide into first and second portions by diffracting a portion of the light corresponding to the image in a first direction, and diffracting a portion of the light corresponding to the image in a second direction, wherein the first and second directions differ from one another, and wherein the first and second portions of the FOV differ from one another. In accordance with an embodiment, one of the first and second directions comprises a leftward direction, and the other one of the first and second directions comprises a rightward direction. Step 706 involves, after the light corresponding to the image has travelled through portions of the optical waveguide by way of total internal reflection (TIR) (e.g., from an input-coupler to a spatially separated output-coupler), combining the light corresponding to the first and second portions of the FOV, and coupling the light corresponding to the combined first and second portions of the FOV out of the optical waveguide so that the light corresponding to the image and the combined first and second portions of the FOV is output from the optical waveguide and viewable from the output-pupil. As can be appreciate from the above discussion of FIGS. 3-6, steps 702 and 704 can be performed by an input-coupler (e.g., 312, 412, 512 or 612) of the optical waveguide, and step 706 can be performed by an output-coupler (e.g., 316, 416, 516 or 616) of the optical waveguide.

In accordance with certain embodiments, prior to combining the light corresponding to the first and second portions of the FOV to thereby unify the FOV that was split, the light corresponding to the first and second portions of the FOV is transferred from the input-coupler, respectively, to first and second intermediate-components of the optical waveguide by way of total internal reflection (TIR), and the first and second intermediate-components of the optical waveguide are used to perform one of horizontal or vertical pupil expansion. In accordance with certain embodiments, the output-coupler of the optical-waveguide is used to perform the other one of horizontal or vertical pupil expansion.

In such embodiments, the input-coupler, by diffracting a portion of the light corresponding to the image in the first direction toward a first intermediate-component, and diffracting a portion of the light corresponding to the image in the second direction toward the second intermediate-component, splits the FOV into the first and second portions. The output-coupler, by combining the light corresponding to the first and second portions of the FOV, unifies the FOV that was split by the input-coupler. Using such embodiments, a unified FOV associated with the light coupled out of the optical waveguide, by the output-coupler, is greater than a maximum FOV that each of the first and second intermediate-components can support on their own, as was explained above. As noted above, it is also possible that a FOV associated with light corresponding to an image that is coupled into a waveguide by an input-coupler can be split into more than two portions, and the more than two portions of the FOV can be combined by the output-coupler of the waveguide.

Embodiments described herein can be used to increase (also referred to as extend) the FOV that can be supported by an optical waveguide, without requiring that image tiling be used, which has been proposed. Further, embodiments described herein can be used to increase the FOV that can be supported by an optical waveguide, without requiring the use of switchable Bragg gratings. Nevertheless, it is possible that one or more of the input-coupler, intermediate-components and output-coupler, in the embodiments described with reference to FIGS. 3-6, can be implemented using a switchable Bragg grating. However, in such an embodiment, it would not be the fact the grating is switchable that enables the optical waveguide to support a large FOV, as was the case in other proposals that rely only switching and time division multiplexing of different portions of an image and/or different grating prescriptions to support a large FOV.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus for use in replicating an image associated with an input-pupil to an output-pupil, the apparatus comprising:
   an optical waveguide including an input-coupler, first and second intermediate-components and an output-coupler;
   the input-coupler comprising a diffraction grating and configured to:
      couple light corresponding to the image associated with the input-pupil, and having a corresponding field of view (FOV), into the optical waveguide;
      diffract a portion of the light corresponding to the image in a first direction toward the first intermediate-component such that a first portion of the FOV travels through the optical waveguide from the input-coupler to the first intermediate-component; and
      diffract a portion of the light corresponding to the image in a second direction toward the second intermediate-component such that a second portion of the FOV travels through the optical waveguide from the input-coupler to the second intermediate-component;
      wherein the first and second directions differ from one another; and
      wherein the first and second portions of the FOV differ from one another;
   the first intermediate-component configured to diffract light corresponding to the first portion of the FOV, which travels through the optical waveguide from the input-coupler to the first intermediate-component, toward the output coupler;
   the second intermediate-component configured to diffract light corresponding to the second portion of the FOV, which travels through the optical waveguide from the input-coupler to the second intermediate-component, toward the output coupler; and
   the output-coupler configured to:
      combine the light corresponding to the first and second portions of the FOV, which travel through the optical waveguide from the first and second intermediate-components to the output-coupler; and
      couple the light corresponding to the combined first and second portions of the FOV out of the optical waveguide so that the light corresponding to the image and the combined first and second portions of the FOV is output from the optical waveguide and viewable from the output-pupil.

2. The apparatus of claim 1, wherein:
   the input-coupler, by diffracting the portion of the light corresponding to the image in the first direction toward the first intermediate-component, and diffracting the portion of the light corresponding to the image in the second direction toward the second intermediate-component, splits the FOV into the first and second portions;
   the output-coupler, by combining the light corresponding to the first and second portions of the FOV, unifies the FOV that was split by the input-coupler; and
   a unified FOV associated with the light coupled out of the optical waveguide, by the output-coupler, is greater than a maximum FOV that each of the first and second intermediate-components can support on their own.

3. The apparatus of claim 1, wherein:
each of the first and second intermediate-components is configured to perform one of horizontal or vertical pupil expansion; and
the output-coupler is configured to perform the other one of horizontal or vertical pupil expansion.

4. The apparatus of claim 1, wherein:
one of the first and second directions comprises a leftward direction; and
the other one of the first and second directions comprises a rightward direction.

5. The apparatus of claim 1, wherein the first portion of the FOV partially overlaps with the second portion of the FOV.

6. The apparatus of claim 1, wherein:
the optical waveguide includes a first major surface and a second major surface opposite to the first major surface; and
the diffraction grating of the input-coupler comprises a surface relief grating (SRG) that is located in or on a single one of the first and second major surfaces of the optical waveguide.

7. The apparatus of claim 1, wherein:
the optical waveguide includes a first major surface and a second major surface opposite to the first major surface; and
the diffraction grating of the input-coupler comprises:
a first surface relief grating (SRG) that is located in or on one of the first and second major surfaces of the optical waveguide and is configured to diffract the light corresponding to the first portion of the FOV in the first direction toward the first intermediate-component; and
a second SRG that is located in or on the other one of the first and second major surfaces of the optical waveguide and is configured to diffract the light corresponding to the second portion of the FOV in the second direction toward the second intermediate-component.

8. The apparatus of claim 1, further comprising one or more further intermediate-components, which is/are in addition to the first and second intermediate-components, wherein:
the input-coupler is also configured to diffract light corresponding to at least a portion of the FOV to each of the one or more further intermediate-components; and
the one or more further intermediate-components is/are each configured to diffract light, corresponding to at least a portion of the FOV that is incident on the further intermediate-component, toward the output-coupler.

9. The apparatus of claim 1, further comprising:
a display engine configured to produce an image;
wherein the light corresponding to the image that is coupled into the optical waveguide by the input-coupler comprises the light corresponding to the image that is produced by the display engine.

10. The apparatus of claim 1, wherein each of the input-coupler, the first and second intermediate-components and the output-coupler comprises a separate diffractive optical element (DOE).

11. The apparatus of claim 1, wherein the apparatus is part of a head-mounted display (HMD) or a heads-up display (HUD).

12. A method for using an optical waveguide to replicate an image associated with an input-pupil to an output-pupil, the method comprising:

coupling light corresponding to the image associated with the input-pupil, and having a corresponding field of view (FOV), into the optical waveguide;
splitting the FOV of the image coupled into the optical waveguide into first and second portions by diffracting a portion of the light corresponding to the image in a first direction, and diffracting a portion of the light corresponding to the image in a second direction, wherein the first and second directions differ from one another, and wherein the first and second portions of the FOV differ from one another; and
after the light corresponding to the image has travelled through portions of the optical waveguide by way of total internal reflection, combining the light corresponding to the first and second portions of the FOV, and coupling the light corresponding to the combined first and second portions of the FOV out of the optical waveguide so that the light corresponding to the image and the combined first and second portions of the FOV is output from the optical waveguide and viewable from the output-pupil.

13. The method of claim 12, wherein:
one of the first and second directions comprises a leftward direction; and
the other one of the first and second directions comprises a rightward direction.

14. The method of claim 12, wherein:
the coupling light corresponding to the image associated with the input-pupil, and having the corresponding FOV, into the optical waveguide, and the splitting the FOV of the image coupled into the optical waveguide into the first and second portions, by diffracting the portion of the light corresponding to the image in the first direction, and diffracting the portion of the light corresponding to the image in the second direction, are performed by an input-coupler of the optical waveguide;
prior to the combining the light corresponding to the first and second portions of the FOV to thereby unify the FOV that was split, transferring the light corresponding to the first and second portions of the FOV from the input-coupler, respectively, to first and second intermediate-components of the optical waveguide by way of total internal reflection (TIR), and using the first and second intermediate-components of the optical waveguide to perform one of horizontal or vertical pupil expansion; and
the combining the light corresponding to the first and second portions of the FOV, and the coupling the light corresponding to the combined first and second portions of the FOV out of the optical waveguide, are performed by an output-coupler of the optical waveguide.

15. The method of claim 14, further comprising, using the output-coupler to perform the other one of horizontal or vertical pupil expansion.

16. A head-mounted display (HMD) or a heads-up display (HUD) system, comprising:
a display engine configured to produce an image;
an optical waveguide including an input-coupler, first and second intermediate-components, and an output-coupler;
the input-coupler configured to:
couple light corresponding to the image produced by the display engine, and having a corresponding field of view (FOV), into the optical waveguide; and split the FOV of the image coupled into the optical waveguide into first and second portions by diffracting a portion of the light corresponding to the image in a first direction toward the first intermediate-component, and diffracting a portion of the light corresponding to the image in a second direction toward the second-intermediate component, wherein the first and second directions differ from one another, and wherein the first and second portions of the FOV differ from one another; and the output-coupler configured to combine the light corresponding to the first and second portions of the FOV, which travel from the first and second intermediate-components to the output-coupler by way of total internal reflection, and couple the light corresponding to the combined first and second portions of the FOV out of the optical waveguide so that the light corresponding to the image and having the combined first and second portions of the FOV is output from the optical waveguide.

17. The system of claim 16, wherein:

the input-coupler, by diffracting the portion of the light corresponding to the image in the first direction toward the first intermediate-component, and diffracting the portion of the light corresponding to the image in the second direction toward the second intermediate-component, splits the FOV into the first and second portions;

the output-coupler, by combining the light corresponding to the first and second portions of the FOV, unifies the FOV that was split by the input-coupler; and a unified FOV associated with the light coupled out of the optical waveguide, by the output-coupler, is greater than a maximum FOV that each of the first and second intermediate-components can support on their own.

18. The system of claim 16, wherein the first portion of the FOV partially overlaps with the second portion of the FOV.

19. The system of claim 16, wherein:

the optical waveguide includes a first major surface and a second major surface opposite to the first major surface; and a diffraction grating of the input-coupler comprises a surface relief grating (SRG) that is located in or on a single one of the first and second major surfaces of the optical waveguide.

20. The system of claim 16, wherein:

the optical waveguide includes a first major surface and a second major surface opposite to the first major surface; and a diffraction grating of the input-coupler comprises:

a first surface relief grating (SRG) that is located in or on one of the first and second major surfaces of the optical waveguide and that is configured to diffract the light corresponding to the first portion of the FOV in the first direction toward the first intermediate-component; and a second SRG that is located in or on the other one of the first and second major surfaces of the optical waveguide and that is configured to diffract the light corresponding to the second portion of the FOV in the second direction toward the second intermediate-component.

* * * * *